United States Patent [19]
Huddleston et al.

[11] Patent Number: 5,617,992
[45] Date of Patent: Apr. 8, 1997

[54] SOLDERING STRIP AND METHOD OF USING

[75] Inventors: Howard M. Huddleston, Cambridge City, Ind.; Jeffrey L. Insalaco, Brandon; Fletcher L. Odom, Hillsboro, both of Miss.

[73] Assignees: Ford Motor Company, Dearborn, Mich.; Hydro Aluminum Puckett, Inc., Puckett, Miss.

[21] Appl. No.: 515,632

[22] Filed: Aug. 16, 1995

Related U.S. Application Data

[63] Continuation-in-part of Ser. No. 255,154, Jun. 6, 1994, abandoned.

[51] Int. Cl.⁶ ............................................. B23K 1/18
[52] U.S. Cl. .................... 228/183; 228/56.3; 228/246
[58] Field of Search ...................... 228/183, 56.3, 228/246

[56] References Cited

U.S. PATENT DOCUMENTS

| | | | |
|---|---|---|---|
| 3,310,869 | 3/1967 | La Porte et al. | 228/183 X |
| 3,604,104 | 9/1969 | Glasgow | 228/136 |
| 3,710,473 | 1/1973 | McElwain et al. | 228/183 X |
| 4,272,006 | 6/1981 | Kao | 228/183 |
| 4,327,800 | 5/1982 | Miller | 228/183 X |
| 4,678,112 | 7/1987 | Koisuka et al. | 228/183 X |
| 4,824,184 | 6/1989 | Miller, Jr. | 228/563 X |
| 5,242,097 | 9/1993 | Socha | 228/246 X |

*Primary Examiner*—Kenneth J. Ramsey
*Attorney, Agent, or Firm*—Joseph W. Malleck

[57] ABSTRACT

A shaped soldering strip for promoting improved soldering joints to or between a tube array comprising: a thin coupon of solder having margins defining openings aligned with the axes of the tubes to be joined; a collar surrounding each margin to define a cup shape integral with the associated margin, such margin forming the bottom of said cup shape and being positioned by the collar for placement in annular contact or at least in micro-close proximity to the external circumference of an aligned tube to limit downward weepage of flux deposited in said cup shape; and bridges connecting said collars to create said coupon that extends over said frontal area and gangs the collars for positioning on the tubes of said array.

20 Claims, 4 Drawing Sheets

SOLDERING STRIP AND METHOD OF USING

This is a continuation-in-part application of U.S. patent application Ser. No. 08/255,154, filed on Jun. 6, 1994, now abandoned.

BACKGROUND OF THE INVENTION

1. Technical Field

This invention relates to the art of joining workpiece materials by solder (or braze) fluxed to the joint area; and more particularly to joining metal plys to a tube array with one or more of increased accuracy, increased reliability, more economy and less time.

2. Discussion of the Prior Art

Large scale soldering of sheet metal to tubes in a heat exchanger or condenser is today carried out by using individual solder rings which are individually slipped around each tube and stationed adjacent the joint area (see U.S. Pat. No. 4,759,405). It is extremely difficult to control thousands of these small rings to achieve reliable placement; often these rings are each laboriously and mechanically nibbed or clinched to prevent them from falling off or being misplaced.

The prior art has attempted to substitute flat foil solder sheets for individual solder rings; the sheets are saddled around or staked to a tube array (see U.S. Pat. Nos. 4,327,800 and 3,710,473). Unfortunately, such techniques are not only slow due to the necessity for piercing, but do not provide sound solder joints because flux must be eliminated or, if used, the flux weepage along the inside of the sheet openings is not precisely controlled. The prior art has also attempted to gang solder rings on a water soluble adhesive strip for ease of handling, but such adhesive strip fails to eliminate the need for mechanical nibbing and does not contemplate flux weepage control along the interior of the rings (see U.S. Pat. No. 4,842,184).

SUMMARY OF THE INVENTION

This invention is, in a first aspect, a shaped soldering strip for promoting improved soldering joints to a tube array, the tubes of the array projecting from a frontal area. The strip comprises a thin coupon of solder having (i) a plurality of margins defining openings aligned with the axes of the tubes in the tube array to be joined, each margin being sized to fit annularly snugly into its mating tube in micro-close proximity; (ii) a plurality of collars each integral with an associated margin and surrounding each margin to define a cup shape extending upwardly therefrom, each collar having at least one indentation to permit downward weepage, past said margins, of fluid flux deposited in the cup shape and; (iii) bridges connecting the collars to integrate them into a coupon that extends over the frontal area and gangs the collars for positioning on the tubes of the array.

The cup shaped collars and bridges are formed by stamping the coupon from a flat solder sheet. The solder sheet preferably has a thickness in the range of 0.022-0.032 inches, a radial spacing of the margins to the tubes that is equal to or less than 0.002 inches and an angle for the cup shape in the range of 25°-35°. Preferably the coupon has a chemistry consisting, by weight, of 98% zinc and 2% aluminum for soldering a manifold to hairpin tubes.

The invention, in another aspect, is a method of using a shaped unitary soldering strip. The method makes a flux directed solder or brazed joint to an array of tubes projecting from a frontal area. The method comprises essentially: (a) planting the unitary soldering strip over and onto the array of tubes, the strip being shaped as a coupon to possess (i) a plurality of margins defining openings aligned with the axes of the tubes in the array, each margin being sized to fit annularly snugly into its mating tube, (ii) a plurality of collars, each integral with an associated margin and surrounding each margin, each collar being cup shaped with the narrow end of the cup shape integral with a margin, each collar having at least one indentation to permit downward weepage past said margins of flux deposited in the cup shape; and (iii) bridges ganging the collars to integrate them into the coupon; (b) placing members to be joined to the tubes in place below the strip to create a joint receptacle for receiving the melted solder; (c) introducing fluid flux into the cup and allowing for weepage of the flux for a limited period of time downward along the exterior of the tube; and (d) heating the collars to a melted condition whereby capillary action of the soldering material causes solder material to draw into the joint gap wetted by the fluid flux.

Preferably the flux consists of a mixture of Amco-66A flux and ethylene isopropoalcohol in a 50/50 ratio with a thin viscosity. The flux may be introduced by spraying or by dipping the planted strip in a bath of such flux. The heating step is carried out preferably at a temperature of about 750° F. for soldering, and at higher temperature for brazing. The period of time over which the method is carried out is preferably limited to 10-30 seconds and the period of time allowed for weepage in step (c) is limited preferably to 3-5 seconds.

DETAILED DESCRIPTION AND BEST MODE

Figure 1:
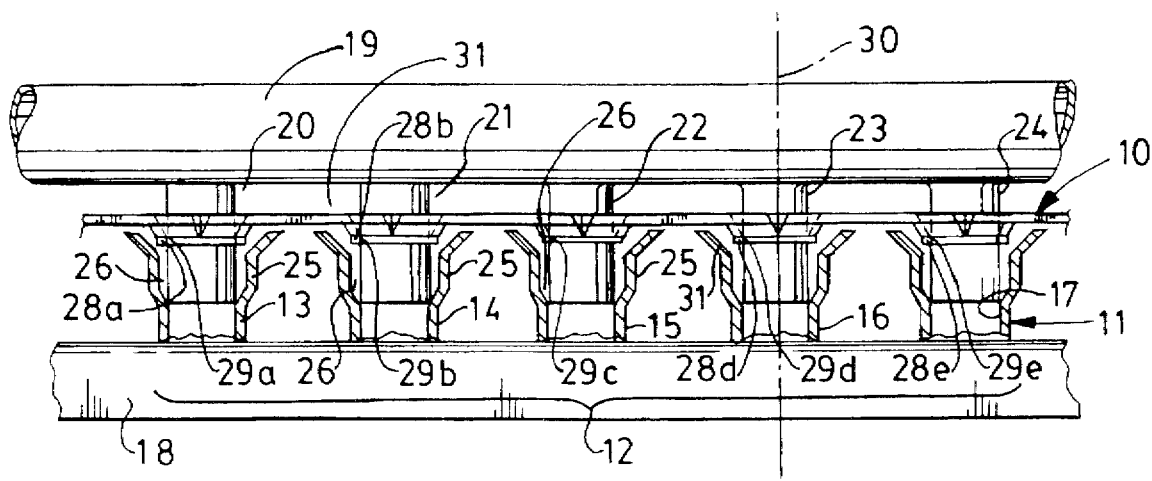
FIG. 1 is an elevational view of a portion of a condenser, partially broken away, showing a tube manifold ready for brazing to a condenser tube array in conformity with this invention.
Figure 3:
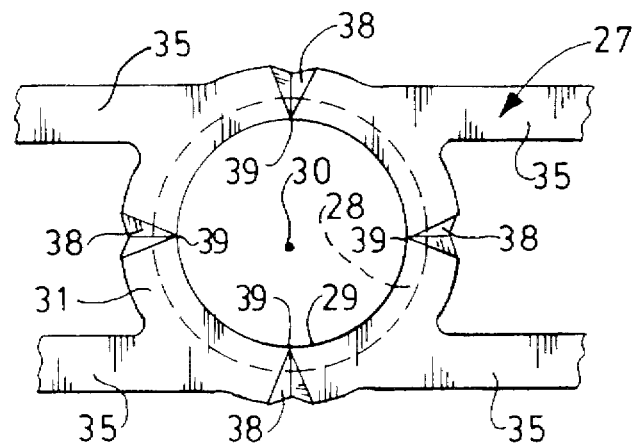
FIG. 3 is a top view of the structure in FIG. 2.
Figure 2:
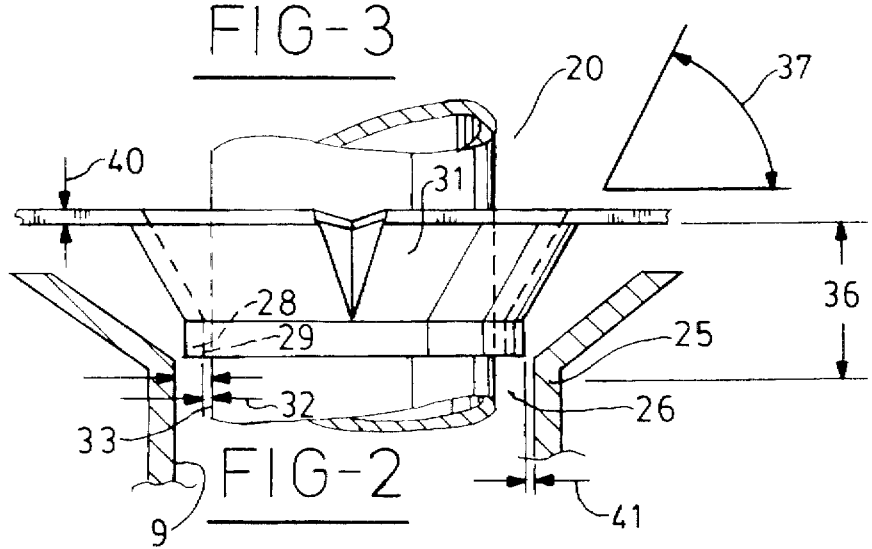
FIG. 2 is an enlarged side view of a portion of the soldering strip used in FIG. 1, showing a first shape.

As shown in FIGS. 1–3 a first shaped strip structure 10 is shown. The strip is effective to promote improved soldering joints between a first tube array 60 and second tube array 11, tube array 11 projects from a frontal area 12 of a condenser 18. In the assembly of FIGS. 1–3, the tube array 11 is comprised of a plurality of tubes 13,14,15,16, and 17 projecting upwardly. The tube array 60 depends from a header 19 and consists of an equivalent complement of slightly smaller diameter tubes (here 20,21, 22,23 and 24) that nest inside flared or necked portions 25 of each of the tubes of the array 12, and sit down at an annular contact ring 90 to define a sleeve-like space 26 therebetween which is open at the top.

The soldering strip 10 is comprised of a thin coupon of solder or equivalent material having (i) margins 28 (here five in number for FIG. 1, identified as 28A,28B, 28C,28D, and 28E) which in turn define openings 29 (again five in number for purposes of FIG. 1, here being 29A,29B, 29C,29D, and 29E) with each of the openings aligned with the axes 30 of the tubes to be joined.

Figure 4:
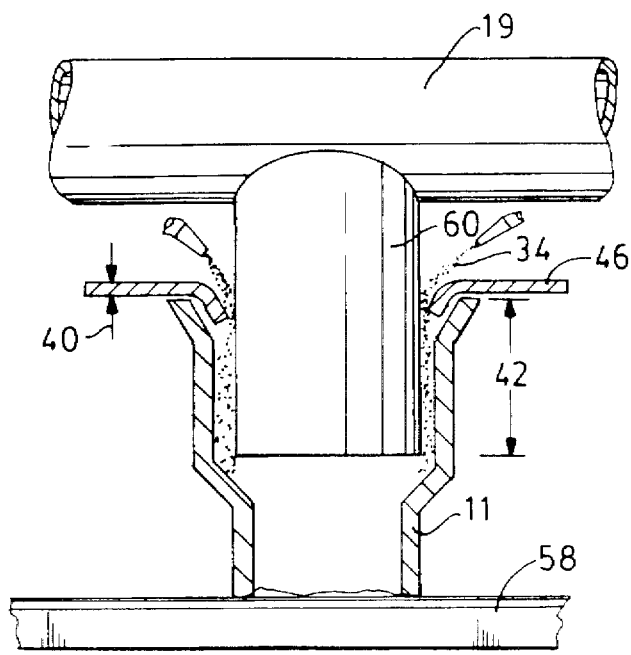
FIG. 4 is an enlarged view of tube on tube brazing using the soldering strip of this invention.

A collar 31 surrounds each margin with each collar defining a cup shape with the narrow or bottom end of the cup shape being integral with a margin; the margins are positioned by the collars for placement in annular contact or least in micro-close proximity 32 to the external circumference or periphery 33 of the respective tubes (tubes may also be non-circular) depending from the header 19 to limit downward weepage of flux 34 deposited therebetween, such as within the cup shape (see FIG. 4). Bridges 35 connect a sufficient number of the collars 31 to create the coupon that extends over the frontal area 12, thereby ganging the required number of collars for a specific application.

The shape of each collar in FIGS. 1–3, is stamped or coined to have a cup depth 36, for example, about 0.11 inch, and a cup angle 37, for example, about 30°. Indented channels 38 are formed at equiangularly spaced locations about the collar, such as at 90° intervals as shown in FIG. 3; each channel 38 forms a tapered trough that converges toward a termination 39 which may leave a very small throat area for controlling flux weepage.

Preferably the cup-shaped collars, margins and bridges together constitute a solder strip formed commonly from a single sheet. The sheet thickness 40 preferably should be in the range of 0.025–0.032 inches, the margins desirably sit above the space 26 which, for example, should have a radial dimension of about 0.001–0.002 inches; the spacing 32 of the margins from the external diameter or circumference 33 of the interior tube 20 should be equal to or less than 0.002 inches, and the angle 37 of the cup preferably should be in the range of 25°–35°.

The coupon sheet preferably has a chemistry consisting of, by weight, 98% zinc and 2% aluminum, for soldering aluminum tubes.

It is important that weepage of the liquid flux 34 (see FIG. 4) be controlled to smear downwardly through space 26 along a predetermined distance 42 of either the external surface 33 of the inner tube 20 (depending from header 19) or along the internal diameter of the outer tube 13. The weepage will depend on flux viscosity and length of joint, but desirably should occur within a time period of 2–5 seconds.

Figure 5A:
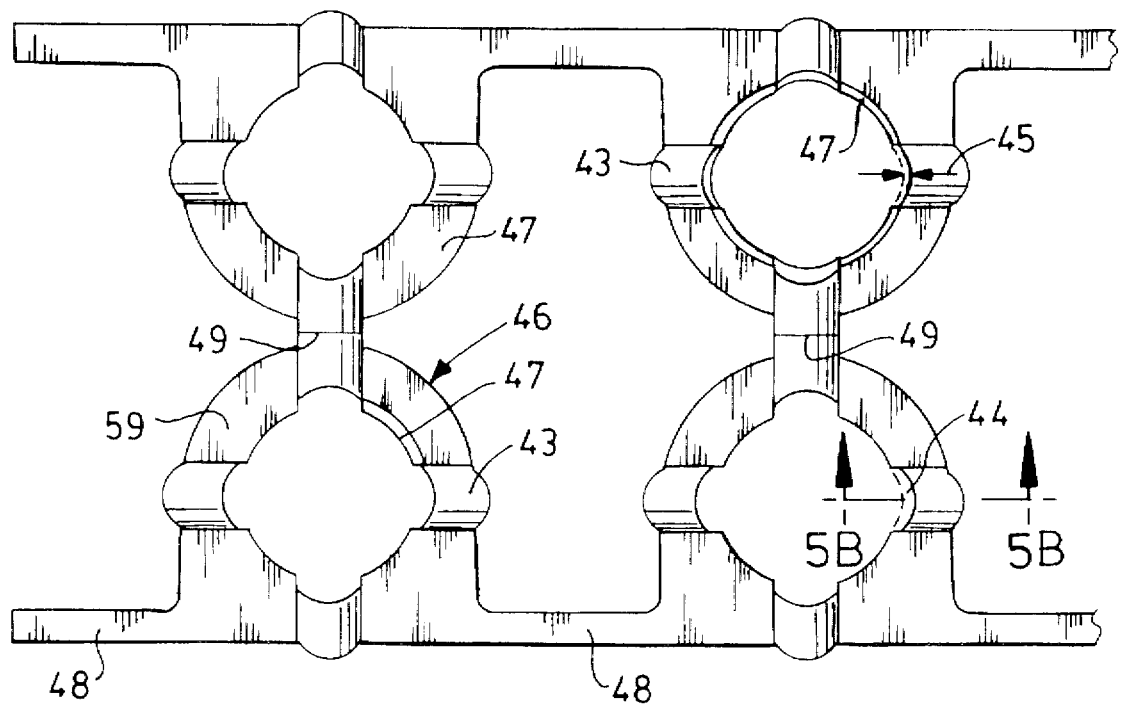
FIG. 5A is a plan view of a soldering strip similar to FIG. 3, but showing a different shape.
Figure 5B:
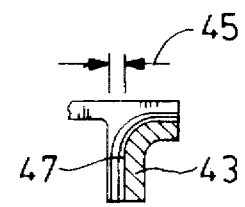
FIG. 5B is a fragmentary sectional view taken along line 5B—5B of FIG. 5A.
Figure 6:
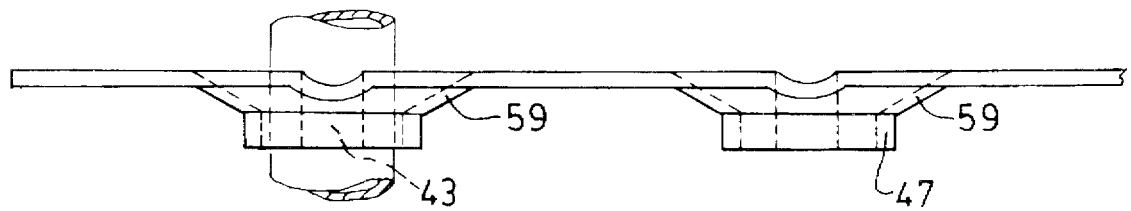
FIG. 6 is a side view of FIG. 5A.

If an application requires greater weepage, the coupon 46 of FIGS. 5A,5B and 6 may be used. Here, the channels are embossed with uniform troughs 43 each having a constant semi-circular cross-section to define a uniform space 44 between the trough and tube, (the space having a radial dimension 44 desirably of about 0.015–0.08 inches). The coupon 46 also has margins 47 for a double row of tube-on-tube joints with some of bridges 48 being no more than a hinge 49 at opposing troughs.

Figure 10:
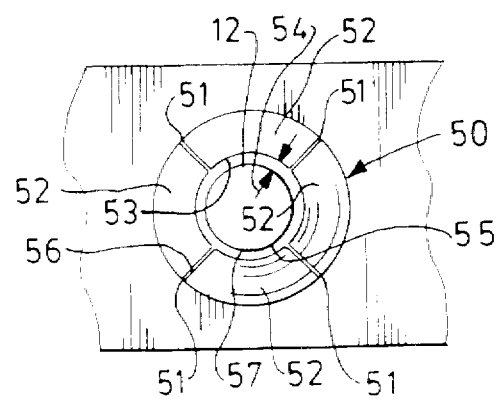
FIG. 10 is a plan view of still another soldering strip shape.

Alternative control of the flux weepage can be obtained by splitting the collars 50 at equi-angular locations 51 (as shown in FIG. 10) to define flanges 52 that may be bent downwardly at a slight angle to position inner edges 53 at a precise diameter and thereby effect a desired micro-spacing 54 with the inner tube 55 to be joined. The radial crevice 56, between the flanges, as well as the inner spacing 57, throttle the liquid flux as it weeps downwardly.

Method of Use

Figure 7:
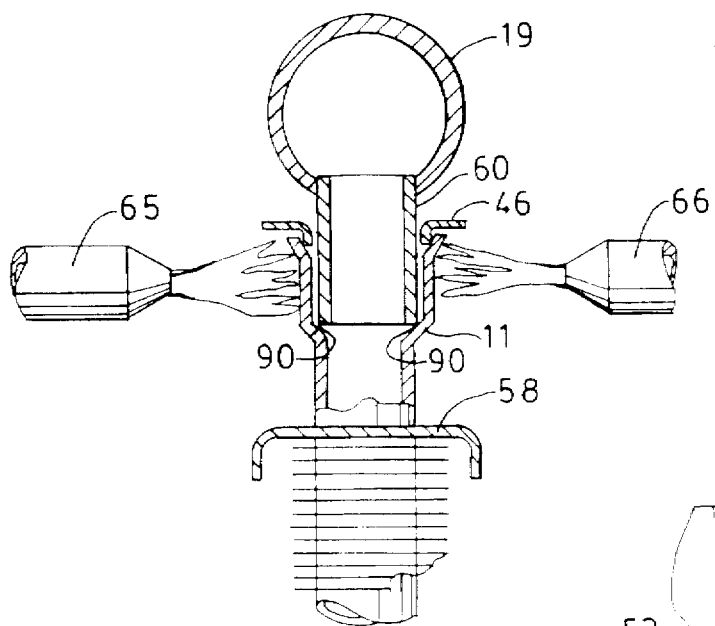
FIG. 7 is a schematic representation of how the brazing heating step is carried out using the soldering strip of this invention.
Figure 8:
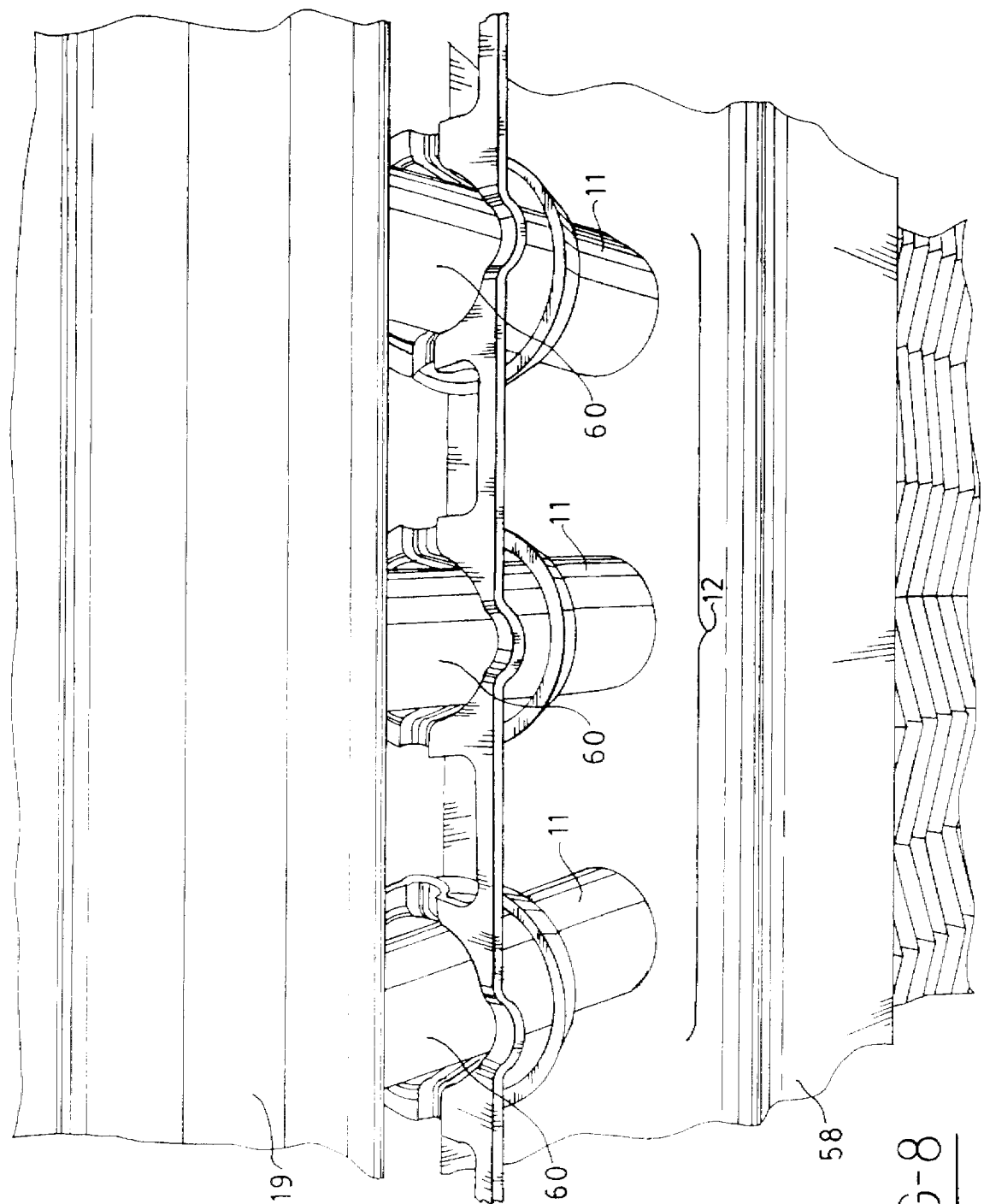
FIG. 8 is an enlarged perspective view of a condenser ready for soldering using the soldering strip of FIG. 5A.

The method of using the shaped strip to make multiple joints is shown sequentially in FIGS. 8, 4 and 7. The joints will be flux directed solderings between the first tube array 60 and the second tube array 11 projecting from a frontal area 12 of a condenser 58. In the embodiment of FIG. 8, the tube array 11 is joined to a tube array 60 depending from header 19. The method comprises essentially (a) planting the shaped soldering strip (in the form of a stamped coupon 46) over and onto the array of tubes 11, such as shown in FIG. 8. The coupon 46 is shaped to possess the characteristics delineated above and further explained below, but most importantly must have a cup shaped collar for each of the tubes with a narrow collar bottom or end that defines integral margins adapted to fit in annular contact or at least micro-closeness to the outer surface of the tubes. The collars and margins each have indentations to control the funnelling of liquid flux along the outer surface of the tube array 11; (b) bringing structure (tube array 60) into close adjacency with tube array 11 to form annular receptacles 26 around each tube which receptacles are positioned immediately below a strip margin; (c) introducing liquid flux 34 into the collars and allowing the flux to weep downward past the margins for a limited period of time; and (d) heating the solder strip to melt at least the margins permitting the solder to move into the receptacles 26 wetted by the flux by capillary action or by oxidation of the solder.

The receptacles 26 are formed by inserting tubes of array 60 down into the flared or necked-out portions of tubes of array 11 until an annular closure contact is achieved at 90. The stamped coupon has margins 47 defining openings aligned with the axes of the tubes 11, such as shown in FIG. 4. Each margin can be a shallow sleeve, as shown in FIG. 6. The margins sit immediately above the opening to a receptacle 26. Surrounding each of the margins is cup-shaped collar 59 (each margin defining the narrow end of the cup shape). The collars have arcuate indented channels 43 at equiangular spaced locations to augment the space between the margin and the tube 11. Bridges 48 gang together the collars into the unitary coupon for mass production handling and for precise locating.

The liquid flux preferably consists of ammonium chloride, sodium fluoride or zinc chloride, and has a viscosity controlled to achieve weepage that coats the exterior length of tubes 11 during a time period of 3–5 seconds. The liquid flux is preferably introduced by spray or squirting techniques, such as shown in FIG. 4, to inject flux into the cup shape of the coupon that weeps or migrates downwardly by gravity to pass into the spacing (receptacle 26) between the tube array 11 and the margins. Such weepage is facilitated by the degree of indentation of the cup shape, and is correlated to the viscosity of the flux, to coat the walls defining such space that is to be eventually filled by solder or brazement.

Heating is preferably carried out by flame impingement such as shown in FIG. 7; flames are caused to impinge preferably from opposite sides of a row of tubes. The heat receiving ends of the tube array 11 will become heated and radiate or conduct heat to the cup shapes of the solder coupon causing them to melt and migrate quickly downwardly as directed by the flux. Heating is preferably carried out to the temperature of about 750° F. when soldering aluminum tubes; the solder composition preferably consists essentially of 98% zinc and 2% aluminum. Although the aluminum content can be increased, for example, up to about 5% of the composition, this will tend to weaken the solder joint but will increase fluidity of the solder itself. When soldering tubes other than aluminum, such as copper or brass, the soldering composition can consist of lead, zinc and small amounts of aluminum present in an amount of 2–5% by weight. When soldering or brazing steel or cast iron members, the soldering composition can consist of 2–5% aluminum and the remainder zinc. Even glass can be soldered or brazed by use of this invention using a composition consisting essentially of zinc. In any event, the soldering strip should consist of a homogeneous soldering composition designed for the application at hand. The volume of solder in the coupon should be adapted to approximate the volume of solder needed to create the desired joints with the specific tube size.

Examples utilizing soldering strips, described herein, with condenser tube arrays constituted of aluminum, has resulted in solder joints which are 100% leak proof tested under a fluid test fixture applying 500 psi pressure. This assumes that the aluminum tubes have a thickness in the range of 0.020–0.016 inches, preferably 0.016 inches. Generally, the tubes utilized with this kind of soldering strip can have a thickness that varies independent of the soldering strip. The thickness of the soldering strip itself should preferably be in the range of 0.022–0.032 inches.

Figure 9:
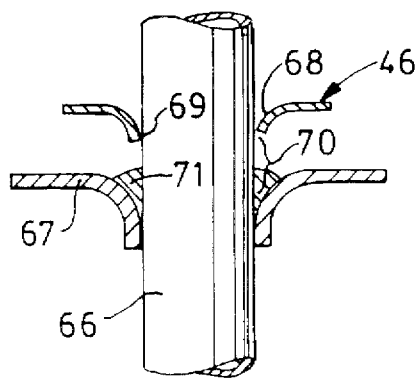
FIG. 9 is a schematic view, partially in section, showing how a fin can be brazed to a tube using the soldering strip of this invention.

The shaped strip may also be used to braze or solder fins to a tube assembly as shown in FIG. 9. Tube 66 is fitted tightly into narrow openings in the fin material 67, such as by pearising. The coupon 46 of the strip is planted onto the tube 66 with the collars forming a cup 68 about the tube 66 and the annular margin 69 hugging closely the outer surface of tube 66. Fluidized flux is deposited in the top of the cup and weeps downwardly between the margin and tube to coat the tube region 70. Upon heating of the coupon 46, melted solder is drawn to and directed by the flux to form a joint, such as shown at 71.

We claim:

1. A shaped soldering strip for promoting improved multiple soldering joints to a tube array, the tubes of said tube array projecting from a frontal comprising:
   (a) a thin coupon of solder having
      (i) a plurality of margins defining openings aligned with the axes of the tubes in said tube array to be joined, each margin being sized to fit annularly snugly to its mating tube in at least micro-close proximity;
      (ii) a plurality of collars each integral with an associated margin and surrounding each margin to define a cup shape extending upwardly therefrom, each said collar having at least one indentation to permit downward weepage past said margin of fluid flux deposited in said cup shape; and
      (iii) bridges connecting said collars to integrate them into said coupon that extends over said frontal area and gangs the collars for positioning on the tubes of said array.

2. The soldering strip as in claim 1, in which substantially the total volume of the strip is designed to be melted and consumed as material forming said multiple joints.

3. The soldering strip as in claim 1, in which the cup shaped collars and bridges are stamped from a flat solder sheet.

4. The soldering strip as in claim 2, in which said solder sheet has a thickness in the range of 0.022–0.032 inches.

5. The soldering strip as in claim 1, in which the radial spacing of each margin with respect to the exterior circumference of an associated tube is equal to or less than 0.002 inches.

6. The soldering strip as in claim 1, in which each collar has walls forming the cup shape which walls present an angle with the axis of the cup which is in the range of 25°–35°.

7. The soldering strip as in claim 1, in which said coupon comprises a material consisting essentially, by weight, of 2–5% aluminum and the remainder zinc for soldering.

8. The soldering strip as in claim 1, in which each collar has a plurality of said indentations, each formed as a tapered channel converging toward said margin.

9. The soldering strip as in claim 1, in which each collar has a plurality of angularly spaced indentations to promote a controlled weepage of fluid flux deposited in said cup shape.

10. The soldering strip as in claim 1, in which said joint to be formed is between substantially flat fins and tubes normal thereto.

11. A method of using a unitary shaped soldering strip to make multiple joints to an array of tubes projecting from a frontal area, comprising:
   (a) planting the unitary soldering strip over and onto the array of tubes, the strip being shaped as a coupon to possess
      (i) a plurality of margins defining openings aligned with the axes of the tubes in said array, each margin being sized to fit annularly snugly to its mating tube;
      (ii) a plurality of collars each integral with an associated margin and surrounding each margin, each collar being cup shaped with the narrow end of the cup shape integral with a margin, each collar having at least one indentation to permit downward weepage past said margins of fluid flux deposited in the cup shape; and
      (iii) bridges ganging the collars to integrate them into said coupon, the cup shape collars of the soldering strip functioning in conjunction with the margins to promote funnelling of fluid flux downward along the outer surface of the tubes;
   (b) bringing structure to be joined to the tube array into close adjacency with the respective tubes in a manner to form an annular receptacle around each tube and positioned immediately below a strip margin;
   (c) introducing liquid flux into the cup shapes and allowing for weepage of the flux for a limited period of time; and
   (d) heating the collars to a melted condition whereby capillary action of the soldering material causes solder material to draw into the joint gap wetted by the fluid flux.

12. The method as in claim 11, in which said heating in step (c) is carried out to a temperature of about 750° F. for a period of 10 seconds for soldering material consisting of zinc with 2–5% aluminum.

13. The method as in claim 11, in which said structure is an array of complementary second tubes each flared to receive the end of first tube to create a receptacle.

14. The method as in claim 13, in which the radial spacing of the flared second tube from said first tube is 0.001–0.002 inches.

15. The method as in claim 13, in which said first tube array is connected to a manifold from which tubes depend, and said second tubes are bent in hairpin turns to connect different first tubes.

16. The method as in claim 11, in which said structure is a planar fin sheet pierced by said annular receptacle to form the joint.

17. The method as in claim 11, in which said step (b) is carried out to allow the liquid flux to weep downwardly along said surface for a period of time within the range of 3–5 seconds.

18. The method as in claim 11, in which the tube array is constituted of a material selected from the group consisting of aluminum, copper, brass, steel, cast iron and glass, and the soldering strip consists essentially of zinc with minor proportions of aluminum or lead adapting the solder to the material.

19. The method as in claim 11, in which said flux is a mixture of flux and ethylene isopropoalcohol in a 50/50 ratio.

20. The method as in claim 11, in which said flux is introduced by spraying or by dipping the planted strip into such flux.

* * * * *